US010009211B1

(12) United States Patent
Barrera

(10) Patent No.: US 10,009,211 B1
(45) Date of Patent: Jun. 26, 2018

(54) RADIO INTERFERENCE ELIMINATOR CIRCUIT

(71) Applicant: Juan Roberto Barrera, Edinburg, TX (US)

(72) Inventor: Juan Roberto Barrera, Edinburg, TX (US)

( * ) Notice: Subject to any disclaimer, the term of this patent is extended or adjusted under 35 U.S.C. 154(b) by 78 days.

(21) Appl. No.: 15/289,832

(22) Filed: Oct. 10, 2016

Related U.S. Application Data

(60) Provisional application No. 62/239,102, filed on Oct. 8, 2015.

(51) Int. Cl.
*H04L 27/26* (2006.01)
*H04L 27/10* (2006.01)
*H04W 40/22* (2009.01)

(52) U.S. Cl.
CPC ........ *H04L 27/2688* (2013.01); *H04L 27/103* (2013.01); *H04W 40/22* (2013.01)

(58) Field of Classification Search
CPC ... H04L 27/2688; H04L 27/103; H04W 40/22
See application file for complete search history.

(56) References Cited

U.S. PATENT DOCUMENTS

| | | | | |
|---|---|---|---|---|
| 2005/0201498 A1* | 9/2005 | Nakai | ................... | H04B 1/1036 375/346 |
| 2007/0248200 A1* | 10/2007 | Aoki | .................... | H04B 7/0848 375/349 |
| 2009/0116415 A1* | 5/2009 | Kashima | ............... | H04B 7/1555 370/279 |
| 2010/0095782 A1* | 4/2010 | Ferencz | .................... | G01F 1/66 73/861.28 |
| 2010/0330916 A1* | 12/2010 | Hsieh | ................... | H04L 27/2657 455/63.1 |
| 2011/0162742 A1* | 7/2011 | Ulens | .................. | F24D 19/1015 137/624.27 |
| 2015/0056940 A1* | 2/2015 | Rangarajan | ............... | H03F 3/19 455/311 |
| 2015/0168593 A1* | 6/2015 | Simon | ...................... | G01V 5/12 250/261 |
| 2015/0244416 A1* | 8/2015 | Veitsel | ................. | H04B 1/7101 375/148 |

\* cited by examiner

*Primary Examiner* — Brian D Nguyen
(74) *Attorney, Agent, or Firm* — Plager Schack LLP; Mark Plager

(57) ABSTRACT

A circuit is disclosed which eliminates chirp produced within an electronic flow measurement (EFM) system. In an exemplary embodiment, relays are positioned between the EFM Rxd input and the communications device input. One relay is closed while the operate signal reaches its high state, allowing data to pass between the communications device and the EFM Rxd input. When the operate line switches to a low state, the first relay opens disrupting the data path between the communications device and the EFM Rxd input preventing data from bouncing back between the two points. The second relay may close grounding the data signal from the communications device eliminating noise from the line.

3 Claims, 5 Drawing Sheets

RADIO INTERFERENCE ELIMINATOR CIRCUIT

CROSS-REFERENCE TO RELATED APPLICATIONS

This application claims benefit under 35 U.S.C. § 119(e) of U.S. Provisional Application having Ser. No. 62/239,102 filed Oct. 8, 2015, which is hereby incorporated by reference herein in its entirety.

BACKGROUND

The embodiments herein relate generally to electrical communication systems, and more particularly to a radio interference eliminator circuit.

In the field of electronic flow measurement (EFM), signal chirping is a long felt problem that has existed in processing by electronic flow computers for over twenty years. Chirping is a parasitic signal which causes interference in data measurements. Chirping arises when a flow computer's communications control line is powered high. FIG. 1 shows a conventional connection between an EFM computer and data communications device (for example, a radio, modem, etc.). The control voltage powers up the data communications device connected to the EFM computer's receive data input (Rxd) line and transmitter data output line (Txd) to receive and transmit data to the polling EFM computer. The communications control line ("OPERATE") powers up the communications device, for a set amount of time that is pre-programmed into the EFM computer. If the EFM computer detects a device's identification (ID) or address, the communications control line remains on to allow communication between the EFM computer and the poling computer. The control typically also powers down after the pre-programmed time elapses and the device ID or address is not detected.

Referring now to FIG. 2, a screenshot of a logic analyzer is shown displaying chirping that arises in a conventional EFM measurement circuit. As the control line (labeled on screen as channel "0 OPER") goes high, the communications device is powered up (represented by the signal on channel "1 DCD")(also known as the data carrier detect). The communications device now begins to receive data as represented by the channel labeled "2 RUS" and passes data to the EFM Rxd Input (channel "4 RX_BD). As can be seen by FIG. 2, when the control line (Channel "0 OPER") goes low, the signals from channels "1 DCD", "2 RUS", and "4 EFM RX_BD" remain high and there is a lag as the length of the Rxd input signal 20 remains high along with the duration of the communications device Rxd line before these signals return to low coinciding with the operate line. During this lag between the EFM Rxd input returning to the low state with the operation line, the EFM Rxd input continues to receive data. However, the Rxd input changes to a high impedance state as the operate line goes to low. The data received by the Rxd input line continues to bounce back and forth between its source, the communications device, and the EFM computer because of the high impedance. Any data in phase with the returning, bouncing data, (the chirp) adds and causes a voltage spike which migrates to the Txd and RTS lines in the EFM computer. This causes the communications device to key up and transmit resulting in interference to the EFM system which lowers system efficiency.

As can be seen, there is a long felt need for a solution to eliminate chirp from this application.

SUMMARY

In one aspect, radio interference eliminator circuit for an electronic flow measurement (EFM) system comprises an EFM control input; an EFM computer receive data input (EFM Rxd); a communications device input (RADIO Rxd) connected to the EFM control input and the EFM computer receive data input (EFM Rxd); a first relay in series between the communications device input (RADIO Rxd) and the EFM computer receive data input (EFM Rxd); and a second relay in series between the communications device input (RADIO Rxd) and ground, wherein in response to the EFM control input reaching a high state, the communications device input (RADIO Rxd) is triggered to provide a data signal, the first relay is energized to provide a data path between the communications device input (RADIO Rxd) and the EFM computer receive data input (EFM Rxd) and the second relay is energized to remove the data path from ground, and in response to the EFM control input reaching a low state, the first relay is configured to open the data path data path between the communications device input (RADIO Rxd) and the EFM computer receive data input (EFM Rxd) and the second relay is configured to ground the data signal.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Embodiments disclosed herein generally provide a circuit that can be embodied in a circuit module which eliminates chirp experienced by EFM systems.

Figure 1:
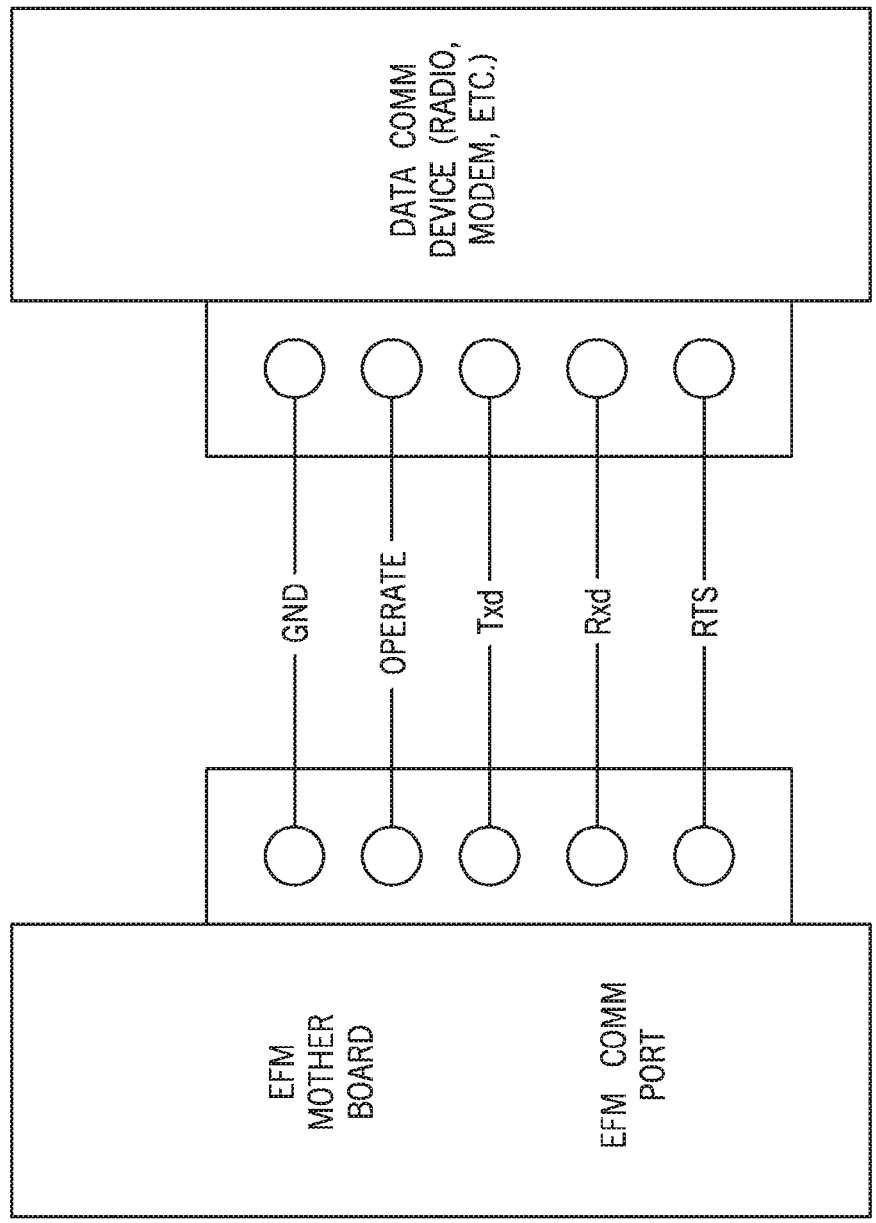
FIG. 1 is a conventional EFM measurement setup and circuit connection.
Figure 2:
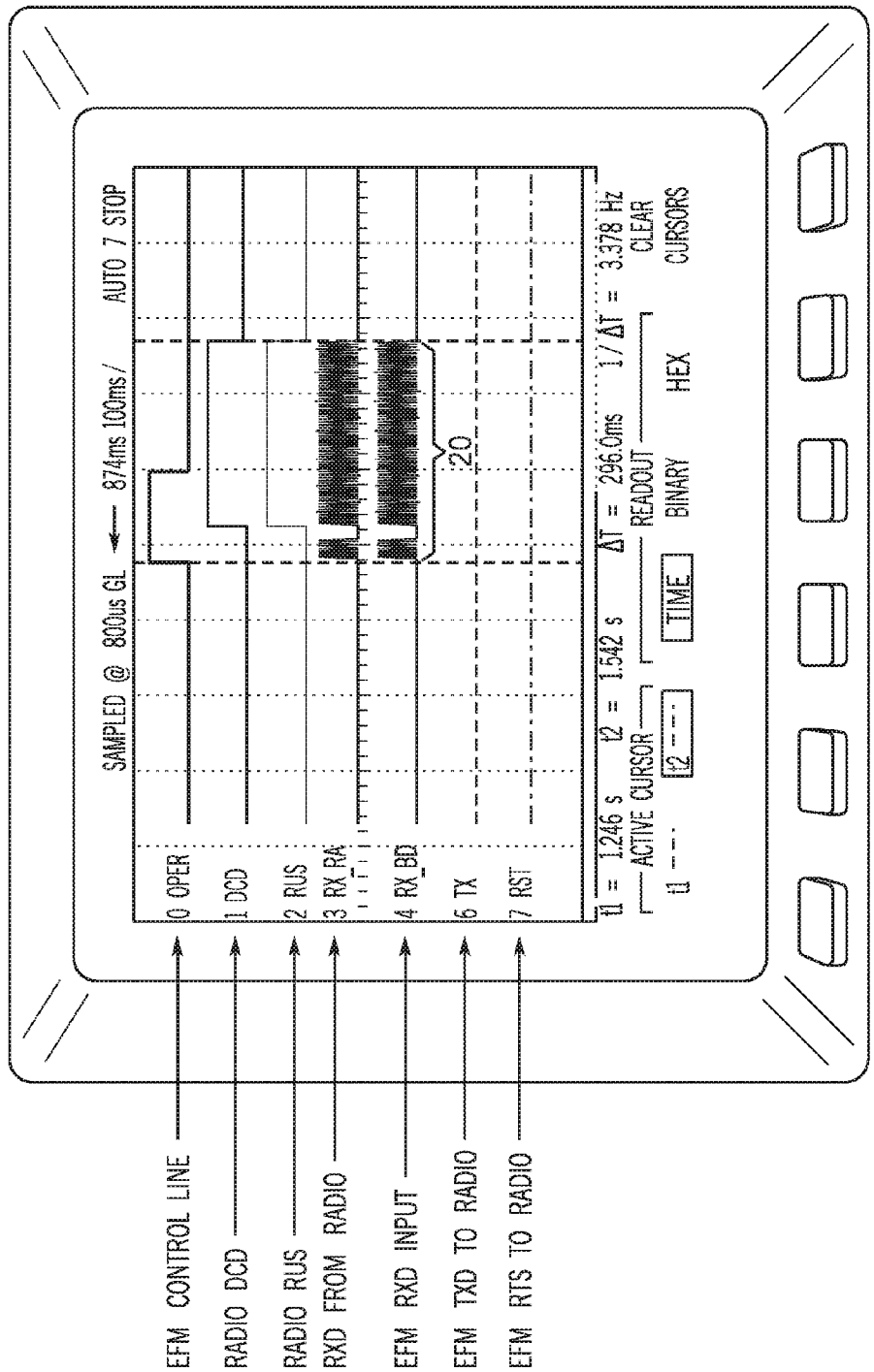
FIG. 2 is a screenshot of a measurement taken by a logic analyzer showing chirp present in the EFM measurement setup of FIG. 1.
Figure 3:
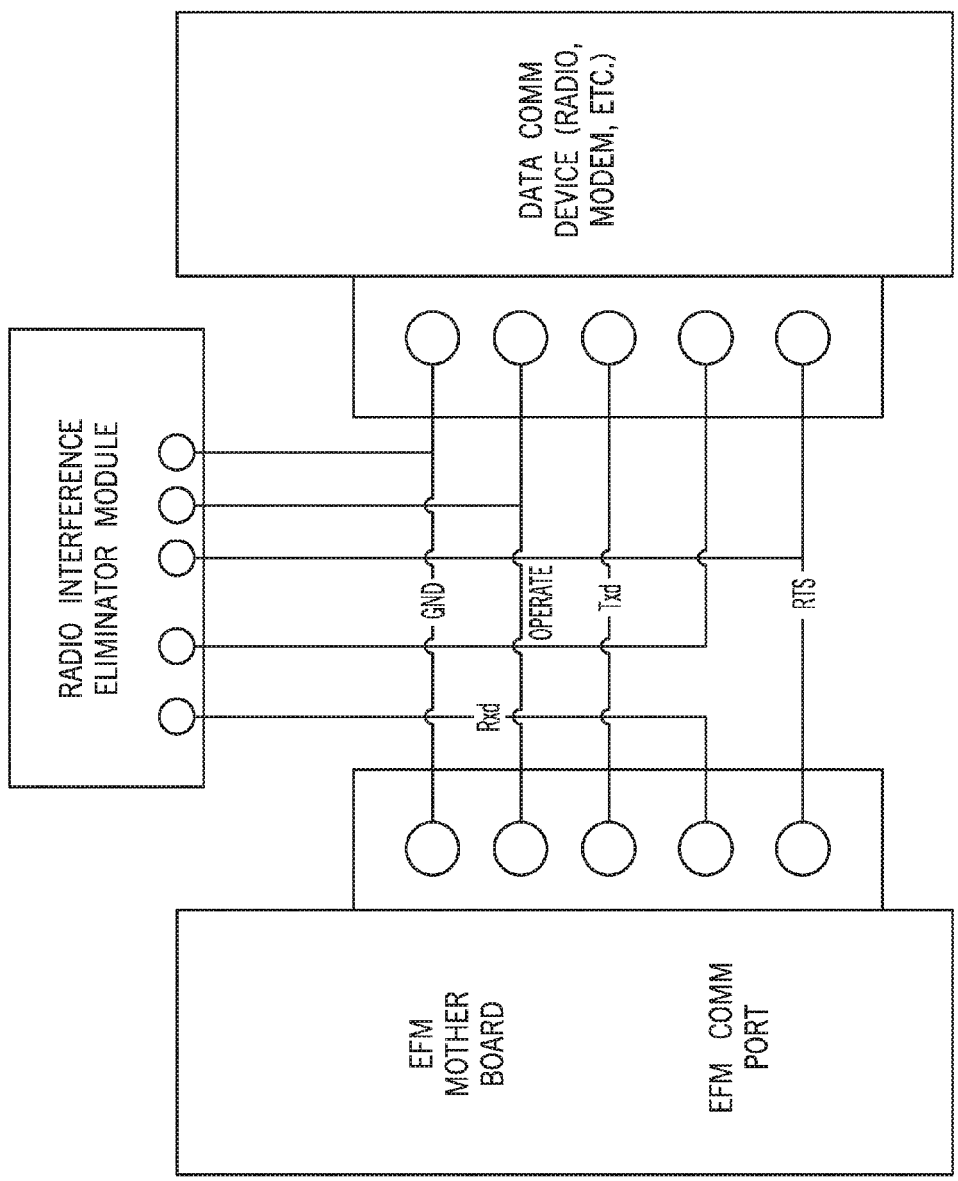
FIG. 3 is an EFM measurement system setup including a radio interference eliminator module according to an embodiment of the subject technology.

Referring now to FIG. 3, an EFM measurement system setup including a radio interference eliminator module according to an embodiment of the subject technology is shown. The system includes a radio interference module connected between a polling EFM computer and a data communications device being polled. The module includes a circuit (described in detail with respect to FIG. 4) which controls the data flow through the Rxd line between the polling EFM computer and a data communications device. Depending on whether the control line is detected on/off, the Rxd line is either active or immediately interrupted to prevent data bouncing and voltage spikes which cause a chirp.

Figure 4:
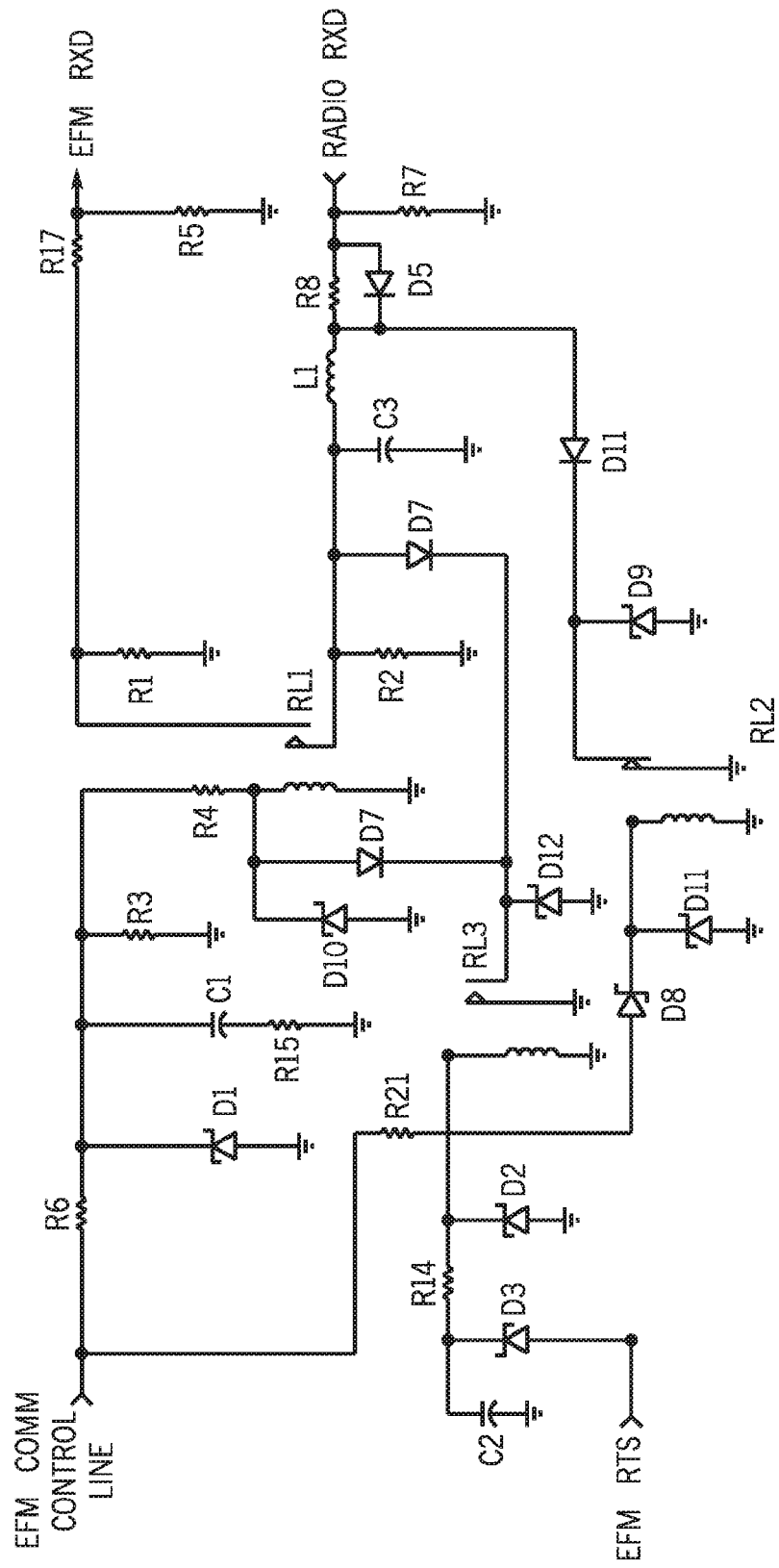
FIG. 4 is a circuit for radio interference elimination used in the module of FIG. 3 according to an embodiment of the subject technology.

Referring now to FIG. 4, an EFM control circuit is shown according to an exemplary embodiment of the subject technology. In comparison to a prior art EFM circuit, the subject circuit includes at least three relays between the EFM Rxd input line and the EFM RTS input line. A first relay RL1 (normally open) is in series with the EFM Rxd input line and in series with a second relay RL3 (normally open). The third relay RL2 (normally closed) is in parallel with the EFM control line. In some embodiments, an inductor L1 may be in series with a resistor R8 which maybe in parallel with a diode D5 (for example, a Schottky diode). The sub-circuit combination of L1, R8, and D5 may be connected in series between relay RL1 and the communications device input (Radio Rxd). The sub-circuit combination of L1, R8, and D5 may be grounded by a third relay RL2.

In operation, as the EFM operate line goes high, RL1 is energized and is closed passing the signal to RL3 which becomes energized and closed. When the relay RL3 is closed, the ground is removed from diode D5 and resistor R8. While relay RL1 is also closed, data is allowed to flow from the communications device (Radio Rxd input) to the EFM Rxd input. When the operate line goes to low, relay RL1 is opened removing the path available for data to flow from the communications device to the EFM Rxd input. Relay RL2 may also de-energize and close which grounds inductor L1, diode D5 and resistor R8 filtering out line noise and data from the communications device (Radio Rxd input). Data is thus prevented from bouncing back and forth from the communications device (Radio Rxd input) and the EFM Rxd input and creating a voltage spike. As might be appreciated, without relay RL1 and relay RL2 in place, data would continue to flow between the communications device (Radio Rxd input) and the EFM Rxd input until the EFM operate input returned to low. In addition, when the RTS line goes high, relay RL3 closes causing relay RL1 to open grounding resistor R8 and diode D5 through inductor L1 removing data and noise signal from the communication device input. When the operate line goes low, relay RL2 closes grounding the Rxd line through diodes D5, D9, and D11 (which may be for example 5V Zener diodes) for protection.

Figure 5:
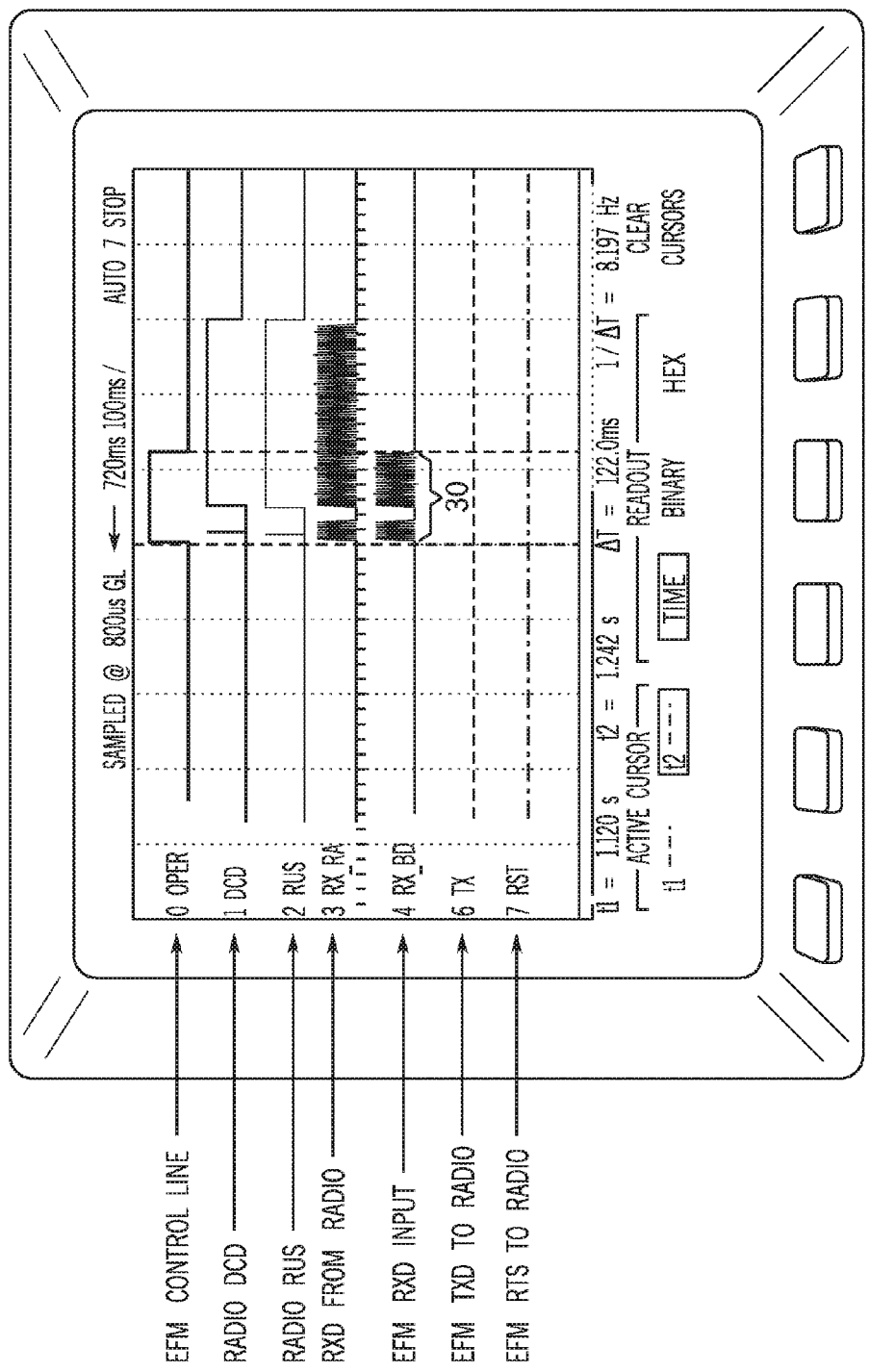
FIG. 5 is a screenshot of a measurement taken by a logic analyzer showing the source of chirp eliminated in the EFM measurement system setup of FIG. 3.

FIG. 5 shows a logic analyzer screenshot of the signals using the circuit module of FIG. 4. As can be seen, the length of the Rxd input signal 30 drops to the low state at the same time as the operate line goes to low, even though the communications device Rxd line stays at the high state. Data from the communications device is unavailable for receipt by the Rxd input and data bounce is avoided. Thus, radio interference from data bouncing (chirp) is eliminated by implementation of the circuit module disclosed.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A radio interference eliminator circuit for an electronic flow measurement (EFM) system, comprising
   an EFM control input;
   an EFM computer receive data input (EFM Rxd);
   a communications device input (RADIO Rxd) connected to the EFM control input and the EFM computer receive data input (EFM Rxd);
   a first relay in series between the communications device input (RADIO Rxd) and the EFM computer receive data input (EFM Rxd); and
   a second relay in series between the communications device input (RADIO Rxd) and ground, wherein
   in response to the EFM control input reaching a high state, the communications device input (RADIO Rxd) is triggered to provide a data signal, the first relay is energized to provide a data path between the communications device input (RADIO Rxd) and the EFM computer receive data input (EFM Rxd) and the second relay is energized to remove the data path from ground, and
   in response to the EFM control input reaching a low state, the first relay is configured to open the data path between the communications device input (RADIO Rxd) and the EFM computer receive data input (EFM Rxd) and the second relay is configured to ground the data signal.

2. The circuit of claim 1, wherein the first relay is normally open and the second relay is normally closed.

3. The circuit of claim 1, further comprising:
   an inductor and a resistor in series with the communications device input (RADIO Rxd) and a diode in parallel with the resistor for filtering noise from the data signal; and
   a third relay connected to ground and in series with the inductor and resistor.

\* \* \* \* \*